(12) United States Patent
Chien et al.

(10) Patent No.: US 8,995,523 B2
(45) Date of Patent: Mar. 31, 2015

(54) MEMORY EFFICIENT CONTEXT MODELING

(75) Inventors: Wei-Jung Chien, San Diego, CA (US);
Marta Karczewicz, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 548 days.

(21) Appl. No.: 13/485,198

(22) Filed: May 31, 2012

(65) Prior Publication Data

US 2012/0328003 A1 Dec. 27, 2012

Related U.S. Application Data

(60) Provisional application No. 61/493,361, filed on Jun. 3, 2011, provisional application No. 61/504,153, filed on Jul. 1, 2011, provisional application No. 61/546,732, filed on Oct. 13, 2011.

(51) Int. Cl.
| | |
|---|---|
| H04N 7/12 | (2006.01) |
| H04N 11/02 | (2006.01) |
| H04N 11/04 | (2006.01) |
| H04N 19/436 | (2014.01) |
| H04N 19/176 | (2014.01) |
| H04N 19/70 | (2014.01) |
| H04N 19/13 | (2014.01) |

(Continued)

(52) U.S. Cl.
CPC ........... *H04N 19/436* (2014.11); *H04N 19/176* (2014.11); *H04N 19/70* (2014.11); *H04N 19/13* (2014.11); *H04N 19/96* (2014.11); *H04N 19/423* (2014.11)

USPC ........... 375/240.03; 375/240.24; 375/240.16; 375/240.12

(58) Field of Classification Search
None
See application file for complete search history.

(56) References Cited

U.S. PATENT DOCUMENTS

| | | |
|---|---|---|
| 2005/0276323 A1 | 12/2005 | Martemyanov et al. |
| 2006/0193388 A1 | 8/2006 | Woods et al. |
| 2008/0219578 A1 | 9/2008 | Lee |

(Continued)

FOREIGN PATENT DOCUMENTS

| | | |
|---|---|---|
| WO | WO2009119888 A1 | 10/2009 |
| WO | WO2010063184 A1 | 6/2010 |
| WO | 2012068021 A1 | 5/2012 |

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29 WG11, 8th Meeting: San José, CA, USA, Feb. 1-10, 2012, 259 pp.

(Continued)

*Primary Examiner* — Dave Czekaj
*Assistant Examiner* — Nam Pham
(74) *Attorney, Agent, or Firm* — Shumaker & Sieffert, P.A.

(57) ABSTRACT

In an example, aspects of this disclosure relate to a method of coding video data that includes determining context information for a block of video data, where the block is included within a coded unit of video data, where the block is below a top row of blocks in the coded unit, and where the context information does not include information from an above-neighboring block in the coded unit. That method also includes entropy coding data of the block using the determined context information.

44 Claims, 10 Drawing Sheets

(51) Int. Cl.
*H04N 19/96* (2014.01)
*H04N 19/423* (2014.01)

(56) References Cited

U.S. PATENT DOCUMENTS

| | | |
|---|---|---|
| 2011/0135000 A1 | 6/2011 | Alshina et al. |
| 2011/0164677 A1 | 7/2011 | Lu et al. |
| 2011/0243226 A1* | 10/2011 | Choi et al. ............... 375/240.12 |
| 2012/0121011 A1 | 5/2012 | Coban et al. |

OTHER PUBLICATIONS

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.
Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross, et al., "WD4: Working Draft 4 of High-Efficiency Video Coding," JCTVC-F803d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
International Preliminary Report on Patentability—PCT/US2012/040483, The International Bureau of WIPO—Geneva, Switzerland—Sep. 9, 2013 (8 pgs.).
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Wiegand, T., et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012] (153 pgs.).
Wiegand, T., et al., "WD3: Working Draft 3 of High-Efficiency Video Coding," Document JCTVC-E603, 5th Meeting: Geneva, CH, Mar. 16-23, 2011, pp. 193.
Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010 (137 pgs.).
Second Written Opinion from International Applicaton No. PCT/US2012/040483, dated Jun. 4, 2013, 12 pp.
Response to Written Opinion dated Jul. 13, 2012, from International Application No. PCT/US2012/040483, filed Apr. 3, 2013, 36 pp.
Response to Second Written Opinion dated Jun. 4, 2013, from International Application No. PCT/US2012/040483, filed Aug. 2, 2013, 29 pp.
Office Action from counterpart Ukraine Application No. 2013 15554, dated May 16, 2014, 7 pp.
Lou et al., "Parallel processing friendly context modeling for significance map coding in CABAC", Joint Collaborative Team on Video Coding,JCTVC-D241, Jan. 20-28, 2011, 4 pp.
Chien et al., "Memory and Parsing Friendly Cabac Context", Joint Collaborative Team on Video Coding, JCTVC-F606, Jul. 14-22, 2011, 4 pages.
International Search Report and Written Opinion, PCT/US2012/040483, International Search Authority—European Patent Office, Jul. 13, 2012, 18 pp.
Marpe et al., "Context-based adaptive binary arithmetic coding in the H.264/AVC video compression standard", IEEE Transactions on Circuits and Systems for Video Technology, vol. 13, No. 7, Jul. 2003, 17 pp.
Nguyen et al., "Improved Context Modeling for Coding Quantized Transform Coefficients in Video Compression", IEEE Picture Coding Symposium, Dec. 8-10, 2010, 4 pp.
Sjaberg et al., "Fine granularity slices", Joint Collaborative Team on Video Coding, JCTVC-C154, Oct. 7-15, 2010, 4 pp.
Sze et al., "Massively Parallel CABAC", International Telecommunications Union—Telecommunications Standardization Sector, VCEG-AL21, Jul. 3, 2009, 10 pp.
Sze et al.,"Joint Algorithm-Architecture Optimization of CABAC to Increase Speed and Reduce Area Cost", IEEE, Acoustics, Speech and Signal Processing International Conference, May 22, 2011, 4 pp.
Wiegand et al., "Overview of the H.264/AVC Video Coding Standard", IEEE Transactions on Circuits and Systems for Video Technology, vol. 13, No. 7, Jul. 2003, 17 pp.
Zheng et al., "CE11: Mode Dependent Coefficient Scanning", Joint Collaborative Team on Video Coding, JCTVC-D393, Jan. 20-28, 2011, 4 pp.
Chien et al., "Memory and Parsing Friendly CABAC Context", Joint Collaborative Team on Video Coding, JCTVC-F606_r2, Jul. 14-22, 2011, 16 pp.
Chien et al., "JCTVC-F606: Memory and Parsing Friendly CABAC Context", Qualcomm, PowerPoint1, Jul. 14-22, 2011, 6 pp.
Chien et al., "JCTVC-F606: Memory and Parsing Friendly CABAC Context", Qualcomm, PowerPoint2, Jul. 14-22, 2011, 6 pp.
Chien, et. al., "CE12: Adaptive Motion Vector Resolution from Qualcomm", JCTVC-D394, Daegu, Jan. 20-28, 2011, 4 pp.
Chien, et al.,"Context reduction for CABAC", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG. 16) ; URL: http://wftp3.itu.int/av-arch/jctvc-site/,, No. JCTVC-G718, 8 pp.
Drugeon, et.al., "Improvement of inter mode coding and split flags coding for LCEC", Mar. 10, 2011, Joint Collaborative Team on Video Coding (JCT-VC) of ITU-T SG16 WP3 and ISO/IEC JTC1/SC29/WG11, Document: JCTVC-E258, 5 pp.
Ono, et al., "Ubiquitous Technology: High-Efficiency Coding of Moving Images—MEPG-4 and H.264—," 1st edition, Apr. 20, 2005, Ohmsha, Ltd., 12 pp.
Australian Examination Report from counterpart Australian Patent Application No. 2012261975, dated Nov. 20, 2014, 3 pp.

\* cited by examiner

MEMORY EFFICIENT CONTEXT MODELING

This application claims priority to U.S. Provisional Application No. 61/493,361, filed 3 Jun. 2011, and U.S. Provisional Application No. 61/504,153, filed 1 Jul. 2011, and U.S. Provisional Application No. 61/546,732, filed 13 Oct. 2011, the contents of each of which are hereby incorporated by reference in their entirety.

TECHNICAL FIELD

This disclosure relates to video coding, and, more specifically, to entropy coding of video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding video data. For example, the techniques of this disclosure include reducing an amount of data that is buffered when entropy coding video data. During entropy coding, a video coding device may select a context model to determine a probability of a value for data to be coded. The context model for a particular block of video data may be based on context information drawn from neighboring blocks of video data. Accordingly, a video coding device may buffer the information of neighboring blocks of video data so that such information is available for use as context information. The techniques of this disclosure relate to limiting the amount of data from neighboring blocks that is buffered during entropy coding. According to some aspects of this disclosure, a video coding device may avoid using data from blocks of video data that are positioned above a block of video data that is currently being coded (e.g., referred to as "above-neighboring blocks") as context information when coding the current block.

In an example, aspects of this disclosure relate to a method of coding video data that includes determining context information for a block of video data, where the block is included within a coded unit of video data, where the block is below a top row of blocks in the coded unit, and where the context information does not include information from an above-neighboring block in the coded unit. That method also includes entropy coding data of the block using the determined context information.

In another example, aspects of this disclosure relate to an apparatus for coding video data that includes one or more processors configured to determine context information for a block of video data, wherein the block is included within a coded unit of video data, wherein the block is below a top row of blocks in the coded unit, and wherein the context information does not include information from an above-neighboring block in the coded unit, and to entropy code data of the block using the determined context information.

In another example, aspects of this disclosure relate to an apparatus for coding video data that includes means for determining context information for a block of video data, wherein the block is included within a coded unit of video data, wherein the block is below a top row of blocks in the coded unit, and wherein the context information does not include information from an above-neighboring block in the coded unit, and means for entropy coding data of the block using the determined context information.

In another example, aspects of this disclosure relate to a computer-readable storage medium having stored thereon instructions that, when executed, cause one or more processors to determine context information for a block of video data, wherein the block is included within a coded unit of video data, wherein the block is below a top row of blocks in the coded unit, and wherein the context information does not include information from an above-neighboring block in the coded unit, and to entropy code data of the block using the determined context information.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
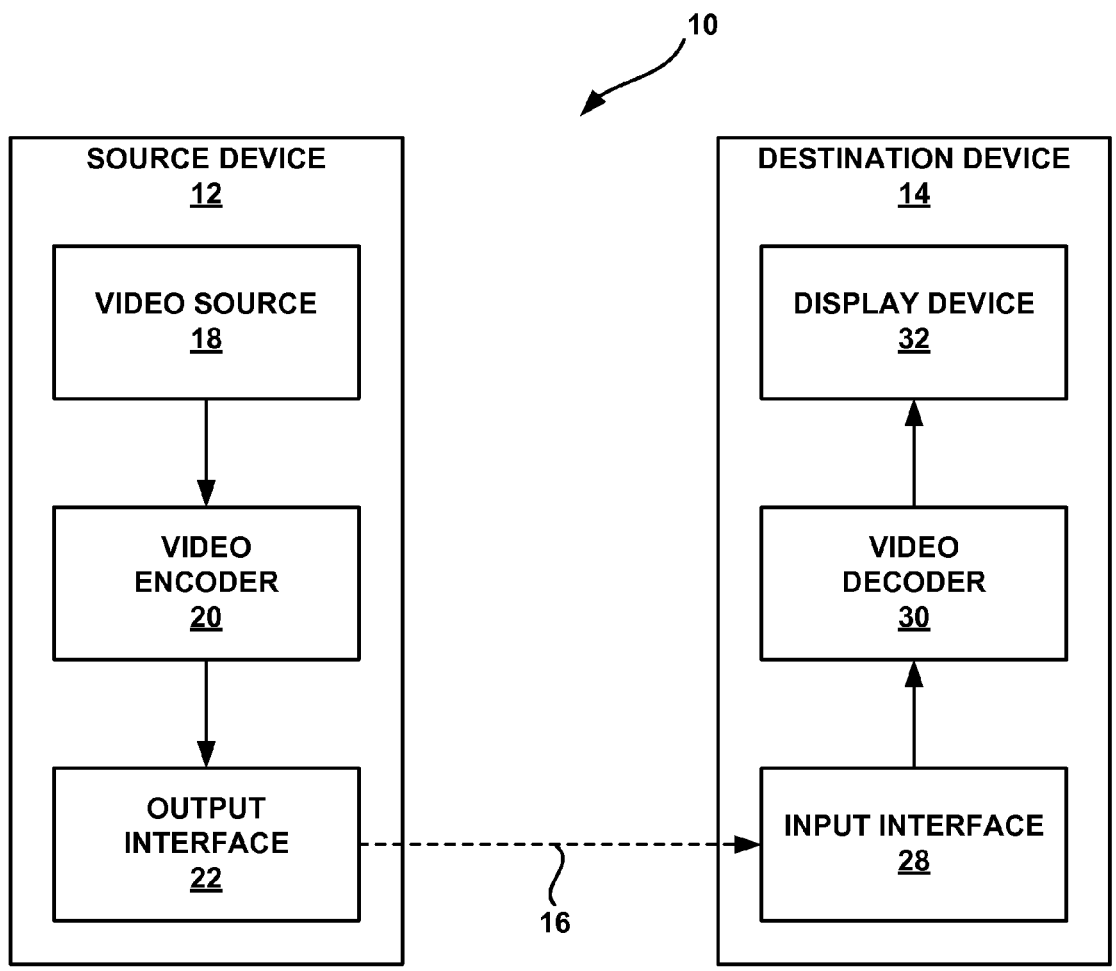
FIG. 1 is a block diagram illustrating an example video encoding and decoding system that may utilize the techniques described in this disclosure.

A video coding device may attempt to compress video data by taking advantage of spatial and temporal redundancy. For example, a video encoder may take advantage of spatial redundancy by coding a block relative to neighboring, previously coded blocks. Likewise, a video encoder may take advantage of temporal redundancy by coding a block relative to data of previously coded frames. In particular, the video encoder may predict a current block from data of a spatial neighbor or from data of a previously coded frame. The video encoder may then calculate a residual for the block as a difference between the actual pixel values for the block and the predicted pixel values for the block. Accordingly, the residual for a block may include pixel-by-pixel difference values in the pixel (or spatial) domain.

The video encoder may then apply a transform to the values of the residual to compress energy of the pixel values into a relatively small number of transform coefficients in the frequency domain. The video encoder may then quantize the transform coefficients. The video encoder may scan the quantized transform coefficients to convert a two-dimensional matrix of quantized transform coefficients into a one-dimensional vector including the quantized transform coefficients. In some cases, the quantization and scanning processes may occur contemporaneously. The process of scanning the coefficients is sometimes referred to as serializing the coefficients.

The video encoder may then apply an entropy coding process to entropy encode the scanned coefficients. Example entropy coding processes may include, for example, context-adaptive variable length coding (CAVLC), context-adaptive binary arithmetic coding (CABAC), syntax-based context-adaptive binary arithmetic coding (SBAC), probability interval partitioning entropy (PIPE) coding or other entropy encoding methodologies. The video encoder may also entropy encode syntax elements associated with the encoded video data for use by a video decoder in decoding the video data.

With respect to (CABAC), a video coder may select a context model that operates on context to encode symbols associated with a block of video data. Context may relate to, for example, whether values are zero or non-zero for symbols neighboring a symbol currently being coded.

According to some examples, the positions of the significant coefficients (i.e., nonzero transform coefficients) in a video block may be encoded prior to the values of the transform coefficients, which may be referred to as the "levels" of the transform coefficients. The process of coding the locations of the significant coefficients may be referred to as significance map coding. A significance map (SM) includes a two-dimensional array of binary values that indicate locations of significant coefficients. For example, an SM for a block of video data may include a two-dimensional array of ones and zeros, in which the ones indicate positions of significant transform coefficients within the block and the zeros indicate positions of non-significant (zero-valued) transform coefficients within the block. The ones and zeros are referred to as "significant coefficient flags."

After the SM is coded, a video coder may entropy code the level of each significant transform coefficient. For example, a video coder may convert an absolute value of each non-zero transform coefficient into binary form. In this way, each non-zero transform coefficient may be "binarized," e.g., using a unary code comprising one or more bits, or "bins." In addition, a number of other binarized syntax elements may be included to allow a video decoder to decode the video data.

A video coder may code each bin for a block of video data, whether corresponding to transform coefficients or syntax information for the block, using probability estimates for each bin. The probability estimates may indicate a likelihood of a bin having a given binary value (e.g., "0" or "1"). The probability estimates may be included within a probability model, also referred to as a "context model." A video coder may select a context model by determining a context for the bin. Context for a bin of a syntax element may include values of related bins of previously coded neighboring syntax elements. In some examples, context for coding a current syntax element may include neighboring syntax elements positioned on the top and to the left of the current syntax element. In any case, a different probability model is defined for each context. After coding the bin, the context model is further updated based on a value of the bin to reflect the most current probability estimates.

In some examples, blocks of video data as small as 4×4 pixels may be used to code a picture. For example, a 1920× 1080 pixel frame (e.g., for 1080 p video) may include as many as 495 blocks of 4×4 pixels. Accordingly, for a bit of context information to be stored per block, a video coder may buffer 495 bits of information. Moreover, in some examples, more than one bit of information may be used as context for coding a particular syntax element, which may greatly increase the amount of data that is buffered for entropy coding.

The techniques of this disclosure generally relate to limiting the amount of data from neighboring blocks that is buffered during entropy coding. For example, rather than using data of above-neighboring blocks as context information when coding a current block, in some examples, a video coding device may determine context based on a characteristic of the syntax element or block being coded. In other examples, the video coding device may determine context based on data from left-neighboring blocks when coding the current block. In still other examples, a video coding device may determine context based on data from an above-neighboring block, but only when the current block is a sub-block of a larger partition (e.g., referred to in the emerging High Efficiency Video Coding (HEVC) standard as a largest coding unit (LCU), as described in greater detail below).

Limiting the amount of data that is buffered, according to the techniques of this disclosure, may reduce the complexity associated with coding video data. For example, entropy coding according to the aspects of this disclosure may allow a video coding device to buffer less data, thereby reducing the memory requirements associated with such buffering.

In addition, reducing the locations from which context is derived may improve entropy coding efficiency and/or throughput. For example, the techniques of this disclosure may be implemented to improve parsing throughput. That is, as video data is received by a video coder, the video data may be parsed, or read and segmented, according to a particular parsing process (e.g., wavefront parsing). In some examples, the parsing process may include parsing each LCU of a slice after parsing one or more initial LCUs (e.g., an upper and/or left most LCU in a slice). Parsing the LCUs may allow for the video coder to form multiple processing threads (e.g., for parallel processing), with each thread including one or more of the parsed LCUs.

Due to context model dependencies, however, certain threads may be dependent on other threads, which may not be optimal for parallel processing applications. For example, a first thread may depend on data processed by a second, different thread, which may cause the first thread to wait until the second thread has processed the data. That is, data is generally parsed up to the point that the data is useful, and then the data is coded. In the case of conventional wavefronts, a video coder may slow to code data of a first (e.g., top) wavefront. That, in turn, may cause the next thread to stop, which causes the next thread to stop, and so on. By eliminating context dependencies, according to the aspects of this disclosure, one thread slowing down will not impact other threads being processed. With respect to parsing, this means that the parser for the thread does not need to reference other threads, but may operate independently for each thread.

In example for purposes of illustration, assume that an LCU currently being coded is positioned below a top row of a slice, with one or more LCUs of the slice positioned above the current slice. In this example, context for coding the current LCU may be included in an upper neighboring LCU (e.g., an LCU positioned above the current LCU). That is, context for coding the current LCU may depend on one or more values of the upper neighboring LCU. Accordingly, the current LCU may have to wait for the upper neighboring LCU to be coded before the current LCU can be coded. Introducing such latency may slow the coding process, particularly in parallel processing applications.

Aspects of this disclosure may be implemented to limit the locations from which context is derived. That is, according to some aspects of this disclosure, a video coder may not use context information from certain neighboring blocks and instead drawing context information from other sources. Accordingly, the techniques of this disclosure may eliminate the context dependencies discussed above and improve parsing throughput.

In addition, in certain cases when a block currently being coded includes context information that depends on another, neighboring block, the current block may not be coded if information from the neighboring block is lost or otherwise unavailable (e.g., due to transmission errors or other errors). In an example for purposes of illustration, a merge coding mode may be used to predict a current block (e.g., prediction information associated with another block is adopted for the current block). If there is an error (e.g., a packet loss) for a reference frame for the current block, the inter-prediction direction for the current block may not be correctly derived. In addition, context that is dependent on the neighboring block (with the error) may also be corrupted. The techniques of this disclosure may eliminate the context dependencies discussed above to reduce the introduction of context derivation errors.

FIG. 1 is a block diagram illustrating an example video encoding and decoding system 10 that may utilize techniques for entropy coding video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage medium 34 or file server 36) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

The techniques of this disclosure, which generally relate to entropy coding data, are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding motion vectors and for performing bi-prediction in HEVC and its extensions, such as multiview or 3DV extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for entropy coding video data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. In particular, this disclosure refers to a "coded unit" as a unit of data including multiple blocks, such as a slice, picture, set of wavefronts, or tile. Thus, the term "coded unit" should be understood to include multiple blocks, e.g., multiple largest coding units (LCUs). Moreover, the term "coded unit" should not be confused with the terms "coding unit" or CU as used in HEVC. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC). Moreover, this disclosure may use the term "coded unit" to describe a predefined quantity of video data, which may include two or more blocks of video data. That is, for example, a coded unit may refer to a picture, a slice, a tile or set of tiles, a set of wavefronts, or any other predefined unit that includes video data. Accordingly, the term "coded unit" should not be confused with the terms "coding unit" or CU.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. Video encoder 20 may also entropy encode syntax elements, such as a significant coefficient flag and a last coefficient flag produced when performing an adaptive scan.

In general, the video decoding process performed by video decoder 30 may include reciprocal techniques to the encoding techniques performed by video encoder 20. Although generally reciprocal, video decoder 30 may, in some instances, perform techniques similar to those performed by video encoder 20. Video decoder 30 may also rely on syntax elements or other data contained in a received bitstream that includes the data described with respect to video encoder 20.

According to aspects of this disclosure, video encoder 20 and/or video decoder 30 may implement the techniques of this disclosure for limiting the amount of data from neighboring blocks that is buffered during entropy coding. For example, rather than using data of above-neighboring blocks as context information when coding a current block, in some examples, video encoder 20 and/or video decoder 30 may determine context based on a characteristic of the syntax element or block being coded. In other examples, video encoder 20 and/or video decoder 30 may determine context based on data from left-neighboring blocks when coding the current block. In still other examples, video encoder 20 and/or video decoder 30 may determine context based on data from an above-neighboring block, but only when the current block is a sub-block of a larger partition (e.g., an LCU). In addition, in some instances, video encoder 20 and/or video decoder 30 may perform one or more techniques of this disclosure in combination.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
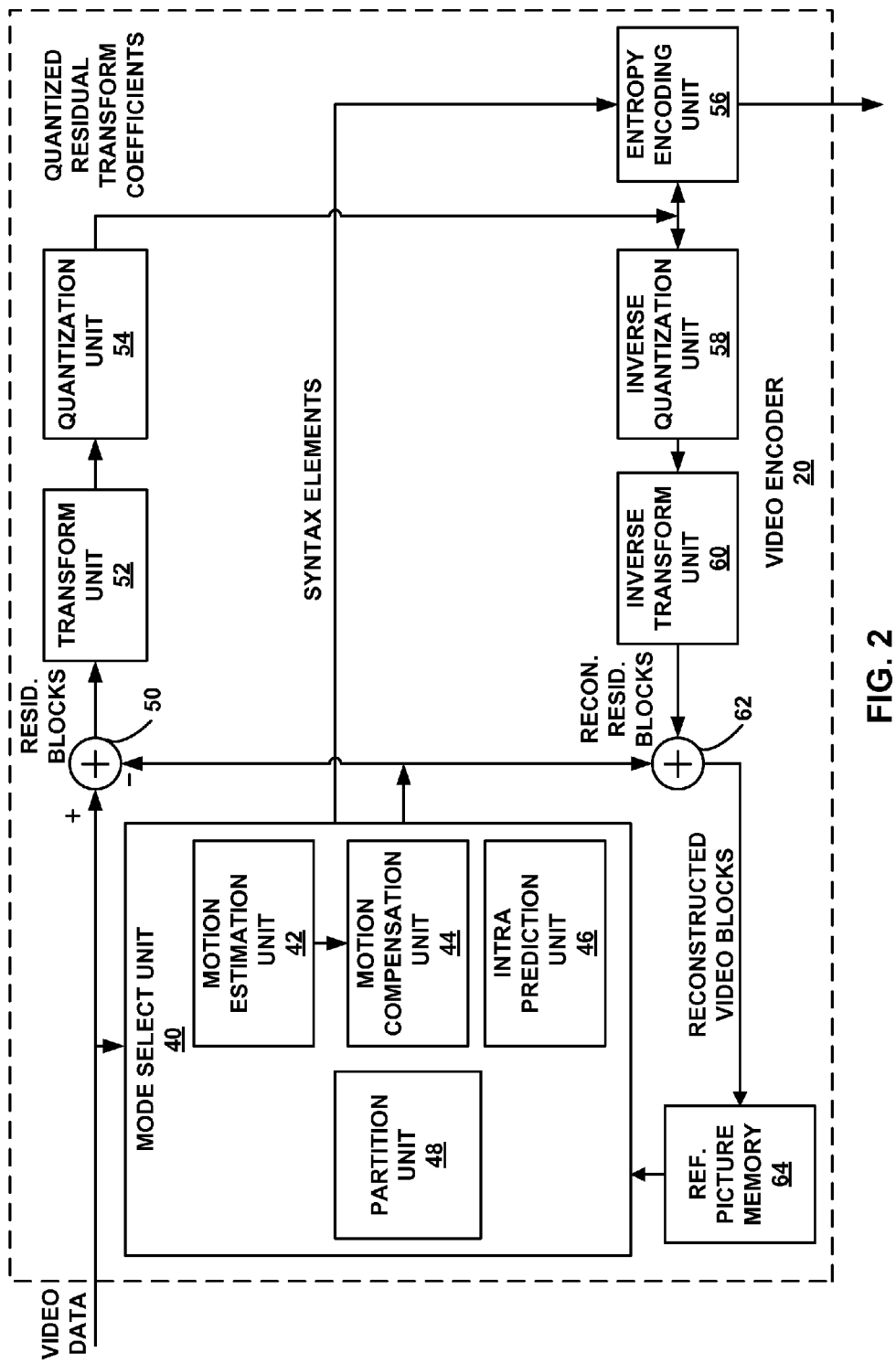
FIG. 2 is a block diagram illustrating an example video encoder that may implement the techniques described in this disclosure.

FIG. 2 is a block diagram illustrating an example video encoder 20 that may implement the techniques described in this disclosure for entropy coding video data. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

As shown in FIG. 2, video encoder 20 receives video data to be encoded. In the example of FIG. 2, video encoder 20 includes a mode select unit 40, summer 50, transform unit 52, quantization unit 54, entropy encoding unit 56, and reference picture memory 64. Mode select unit 40, in turn, includes motion estimation unit 42, motion compensation unit 44, intra prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra-prediction unit 46 may alternatively perform intra-predictive coding of the received video block relative to one or more neighboring blocks in the same frame or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks.

With respect to CABAC, entropy encoding unit 56 may select a context model that operates on context to encode symbols associated with a block of video data. For example, entropy encoding unit 56 may entropy encode each syntax element for a block of video data using probability estimates for each syntax element. The probability estimates may indicate a likelihood of an element having a given value. The probability estimates may be included within a probability model, also referred to as a context model. Entropy encoding unit 56 may select a context model by determining context information (or, more simply, "context") for the syntax element. A different probability model is defined for each context. After coding the syntax element, entropy encoding unit 56 may update the selected context model based on an actual value of the syntax element to reflect the most current probability estimates. That is, for example, entropy encoding unit 56 may update the manner in which a context model is selected to transition to a new context model.

In some examples, context for a particular syntax element may include values of related syntax elements of previously coded, neighboring syntax elements. For example, entropy encoding unit 56 may determine context for coding a current syntax element based on neighboring syntax elements positioned on the top and to the left of the current syntax element. As noted above, the emerging HEVC standard allows for an LCU to be recursively partitioned into sub-CUs as small as 4×4 pixels. Accordingly, a 1920×1080 pixel picture (e.g., for 1080 p video) may include as many as 495 4×4 pixel blocks in a line buffer extending horizontally across a picture. If video encoder 20 buffers a bit of context information per block, video encoder 20 may buffer 495 bits of information.

According to the techniques of this disclosure, entropy encoding unit 56 may determine context for entropy coding video data in such a way that reduces or eliminates the amount of information that is buffered by video encoder 20. For example, according to aspects of this disclosure, rather than using data of above-neighboring blocks as context when encoding syntax elements associated with a current block (e.g., a block that is not at the top row of a coded unit, e.g., a frame or a slice), entropy encoding unit 56 may use only data from left-neighboring blocks.

As another example, entropy encoding unit 56 may use data from an above-neighboring block as context for encoding syntax elements associated with a current block, but only when the current block is a sub-CU of a partitioned largest coding unit (LCU), and the above-neighboring block is within the same LCU. In other words, entropy encoding unit 56 may be configured to avoid using context information that crosses a top LCU boundary.

As still another example, entropy encoding unit 56 may derive context for encoding syntax elements associated with a current block based on local LCU information. For example, entropy encoding unit 56 may derive context information for inter-predicted data based on CU depth, which generally corresponds to a number of times an LCU has been partitioned to reach the CU. In an example for purposes of explanation, assume that an LCU is 64×64 pixels in size (depth zero). A sub-CU of the LCU may be 32×32 pixels in size at CU depth one, while a further sub-CU of the sub-CU may be 16×16 pixels in size at CU depth two.

According to the techniques of this disclosure, entropy encoding unit 56 may determine context for inter-predicted data of a current block based on the CU depth of the current block. That is, for example, CU depth one may correspond to a different probability model than CU depth two. In other words, when coding syntax elements for a CU at a particular CU depth, entropy encoding unit 56 may use the CU depth as context information for selecting a probability model to code the syntax elements.

As another example, entropy encoding unit 56 may derive context information for intra-predicted data based on transform depth information. Transform depth information may be similar to CU depth, but describes the number of times a TU is partitioned (e.g., partitioned according to an RQT structure). Accordingly, for example, TU depth one may correspond to a different probability model than TU depth two. In other words, when coding syntax elements for a TU at a particular TU depth, entropy encoding unit 56 may use the TU depth as context information for selecting a probability model to code the syntax elements Following the entropy coding by entropy encoding unit 56, the encoded bitstream may be transmitted to another device (e.g., video decoder 30) or archived for later transmission or retrieval. Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
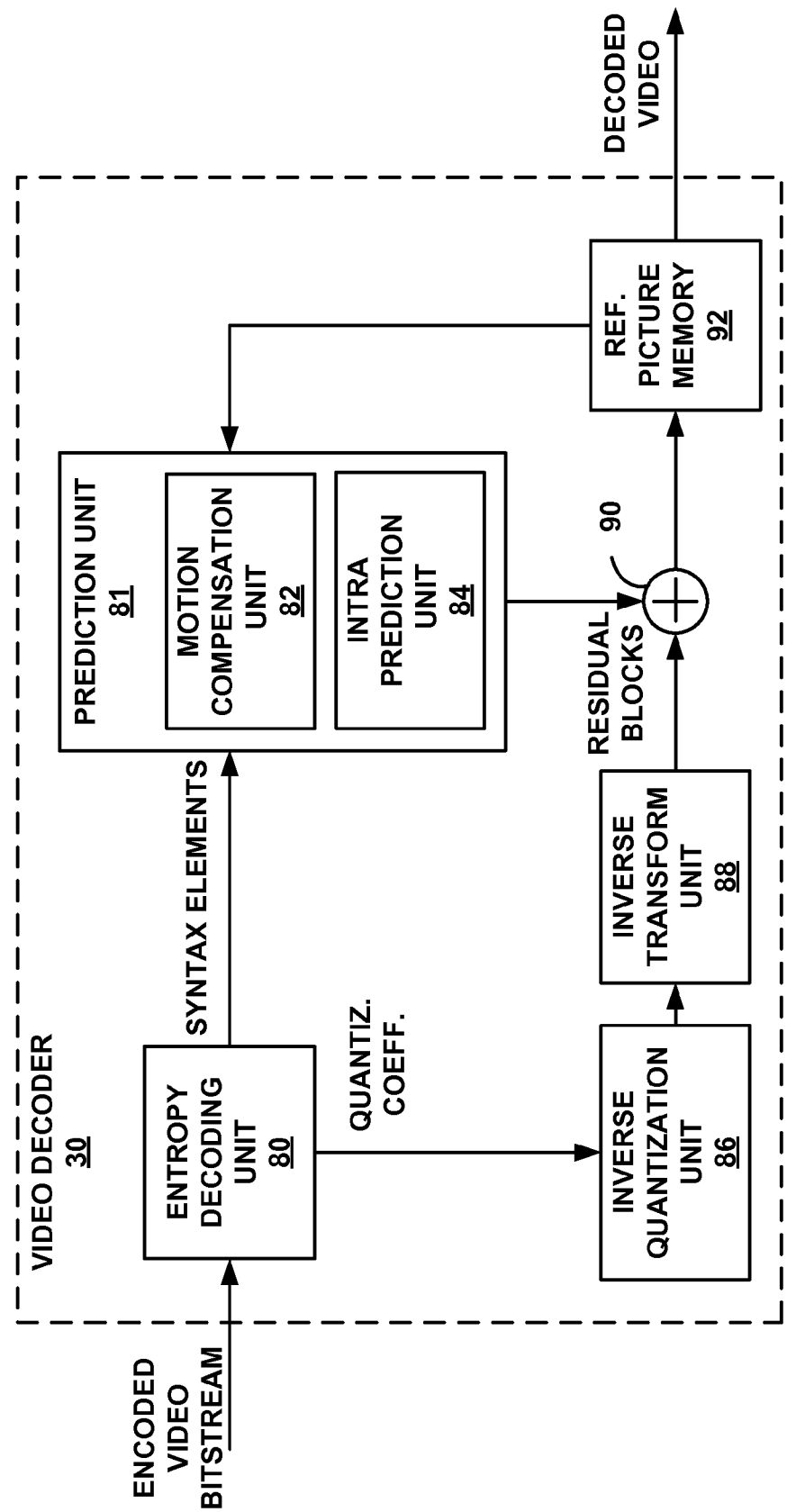
FIG. 3 is a block diagram illustrating an example video decoder that may implement the techniques described in this disclosure.

In this manner, video encoder 20 is an example of a video coder that may perform a method including determining context information for a block of video data, where the block is included within a coded unit of video data, where the block is below a top row of blocks in the coded unit, and where the context information does not include information from an above-neighboring block in the coded unit. The method may also include entropy encoding data of the block using the determined context information FIG. 3 is a block diagram illustrating an example video decoder 30 that may implement the techniques described in this disclosure for entropy coding video data. In the example of FIG. 3, video decoder 30 includes an entropy decoding unit 80, prediction unit 81, inverse quantization unit 86, inverse transformation unit 88, summer 90, and reference picture memory 92. Prediction unit 81 includes motion compensation unit 82 and intra prediction unit 84.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements.

Video decoder 30 may receive the syntax elements at the video slice level and/or the video block level. For example, by way of background, video decoder 30 may receive compressed video data that has been compressed for transmission via a network into so-called "network abstraction layer units" or NAL units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI). For example, parameter sets may contain the sequence-level header information (e.g., in sequence parameter sets (SPS)) and the infrequently changing picture-level header information (e.g., in picture parameter sets (PPS)). The infrequently changing information contained in the parameter sets does not need to be repeated for each sequence or picture, thereby improving coding efficiency. In addition, the use of parameter sets enables out-of-band transmission of header information, thereby avoiding the need of redundant transmissions for error resilience.

Entropy decoding unit 80 may be configured similarly to entropy encoding unit 56, as described above with respect to video encoder 20 of FIG. 2. For example, entropy coding unit 80 may select a context model that operates on context to decode symbols associated with a block of video data. That is, entropy coding unit 80 may entropy code each syntax element for a block of video data using probability estimates for each syntax element. According to the techniques of this disclosure, entropy coding unit 80 may determine context for entropy coding video data in such a way that reduces or eliminates the amount of information that is buffered by video decoder 30. For example, according to aspects of this disclosure, rather than using data of above-neighboring blocks as context when encoding syntax elements associated with a current block (e.g., a block that is not at the top row of a coded unit, e.g., a frame or a slice), entropy coding unit 80 may use only data from left-neighboring blocks.

As another example, entropy coding unit 80 may use data from an above-neighboring block as context for decoding syntax elements associated with a current block, but only when the current block is a sub-CU of a partitioned largest coding unit (LCU), and the above-neighboring block is within the same LCU. In other words, entropy coding unit 80 may be configured to avoid using context that crosses a top LCU boundary. As still another example, entropy coding unit 80 may derive context for decoding syntax elements associated with a current block based on local LCU information (e.g., CU depth, TU depth, or the like). In another example, entropy coding unit 80 may use a single context for decoding certain syntax elements based on the elements themselves. Entropy coding unit 80 may, in some instances, use a combination of these techniques to determine context. After determining context for decoding a particular syntax element, entropy coding unit 80 may select a probability model corresponding to the context, and decode the syntax element using the selected probability model.

Entropy decoding unit 80 forwards the motion vectors and other decoded syntax elements to prediction unit 81. When the video slice is coded as an intra-coded (I) slice, intra prediction unit 84 of prediction unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied.

Inverse transform unit 88 applies an inverse transform, e.g., an inverse DCT, an inverse integer transform, or a conceptually similar inverse transform process, to the transform coefficients in order to produce residual blocks in the pixel domain. According to the aspects of this disclosure, inverse transform unit 88 may determine the manner in which transforms were applied to residual data. That is, for example, inverse transform unit 88 may determine an RQT that represents the manner in which transforms (e.g., DCT, integer transform, wavelet transform, or one or more other transforms) were applied to the residual luma samples and the residual chroma samples associated with a block of received video data.

Figure 4A:
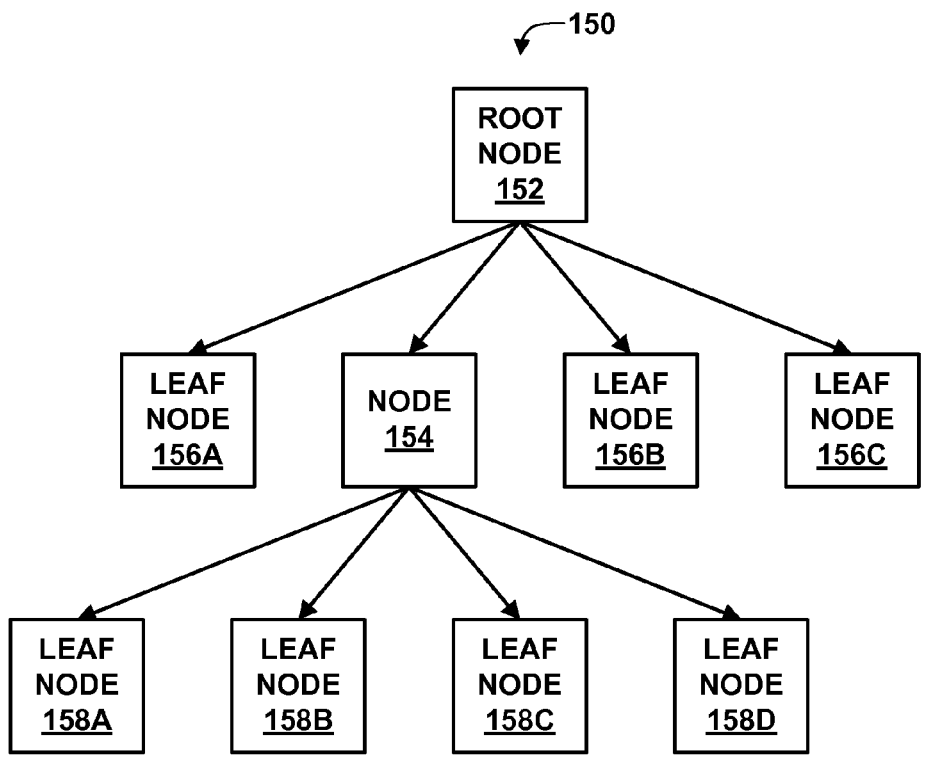
FIGS. 4A and 4B are conceptual diagrams illustrating an example quadtree and a corresponding largest coding unit (LCU).
Figure 4B:
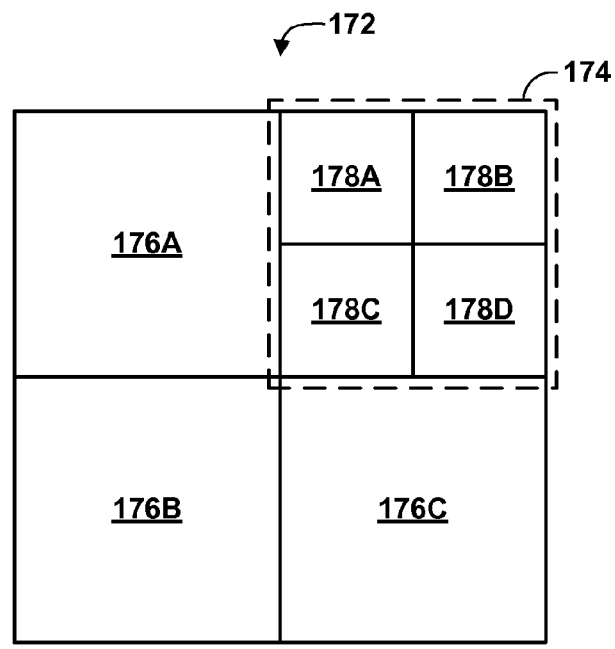

After motion compensation unit 82 generates the predictive block for the current video block based on the motion vectors and other syntax elements, video decoder 30 forms a decoded video block by summing the residual blocks from inverse transform unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1. In this manner, video decoder 30 is an example of a video decoder that may perform a method including determining context information for a block of video data, where the block is included within a coded unit of video data, where the block is below a top row of blocks in the coded unit, and where the context information does not include information from an above-neighboring block in the coded unit. The method may also include entropy decoding data of the block using the determined context information FIGS. 4A and 4B are conceptual diagrams illustrating an example quadtree 150 and a corresponding largest coding unit 172. FIG. 4A depicts an example quadtree 150, which includes nodes arranged in a hierarchical fashion. The quadtree 150 may be associated with, for example, a treeblock according to the proposed HEVC standard. Each node in a quadtree, such as quadtree 150, may be a leaf node with no children, or have four child nodes. In the example of FIG. 4A, quadtree 150 includes root node 152. Root node 152 has four child nodes, including leaf nodes 156A-156C (leaf nodes 156) and node 154. Because node 154 is not a leaf node, node 154 includes four child nodes, which in this example, are leaf nodes 158A-158D (leaf nodes 158).

Quadtree 150 may include data describing characteristics of a corresponding largest coding unit (LCU), such as LCU 172 in this example. For example, quadtree 150, by its structure, may describe splitting of the LCU into sub-CUs. Assume that LCU 172 has a size of 2N×2N. LCU 172, in this example, has four sub-CUs 176A-176C (sub-CUs 176) and 174, each of size N×N. Sub-CU 174 is further split into four sub-CUs 178A-178D (sub-CUs 178), each of size N/2×N/2. The structure of quadtree 150 corresponds to the splitting of LCU 172, in this example. That is, root node 152 corresponds to LCU 172, leaf nodes 156 correspond to sub-CUs 176, node 154 corresponds to sub-CU 174, and leaf nodes 158 correspond to sub-CUs 178.

Data for nodes of quadtree 150 may describe whether the CU corresponding to the node is split. If the CU is split, four additional nodes may be present in quadtree 150. In some examples, a node of a quadtree may be implemented similar to the following pseudocode:

```
quadtree_node {
    boolean split_flag(1);
    // signaling data
    if (split_flag) {
        quadtree_node child1;
        quadtree_node child2;
        quadtree_node child3;
        quadtree_node child4;
    }
}
```

The split_flag value may be a one-bit value representative of whether the CU corresponding to the current node is split. If the CU is not split, the split_flag value may be '0', while if the CU is split, the split_flag value may be '1'. With respect to the example of quadtree 150, an array of split flag values may be 101000000.

As noted above, CU depth may refer to the extent to which an LCU, such as LCU 172 has been divided. For example, root node 152 may correspond to CU depth zero, while node 154 and leaf nodes 156 may correspond to CU depth one. In addition, leaf nodes 158 may correspond to CU depth two. According to aspects of this disclosure, CU and/or TU depth may be used as context for entropy coding certain syntax elements. In an example for purposes of explanation, one or more syntax elements associated with leaf node 156A may be entropy coded using a different context model than leaf node 158A, because leaf node 156A is located at depth one, while leaf node 158A is located at depth two.

While FIG. 4A illustrates an example of a CU quadtree, it should be understood that a similar quadtree may be applied to TUs of a leaf-node CU. That is, a leaf-node CU may include a TU quadtree (referred to as a residual quad tree (RQT)) that describes partitioning of TUs for the CU. A TU quadtree may generally resemble a CU quadtree, except that the TU quadtree may signal intra-prediction modes for TUs of the CU individually.

According to the techniques of this disclosure, a video coder (e.g., video encoder 20 and/or video decoder 30) may determine context for inter-predicted data of a current block based on the CU depth of the current block. That is, for example, when coding syntax elements for a CU at a particular CU depth, the video coder may use the CU depth as context information for selecting a probability model to code the syntax elements. As another example, the video coder may derive context information for intra-predicted data based on transform depth information. That is, for example, when coding syntax elements for a TU at a particular TU depth, entropy encoding unit 56 may use the TU depth as context information for selecting a probability model to code the syntax elements.

Figure 5:
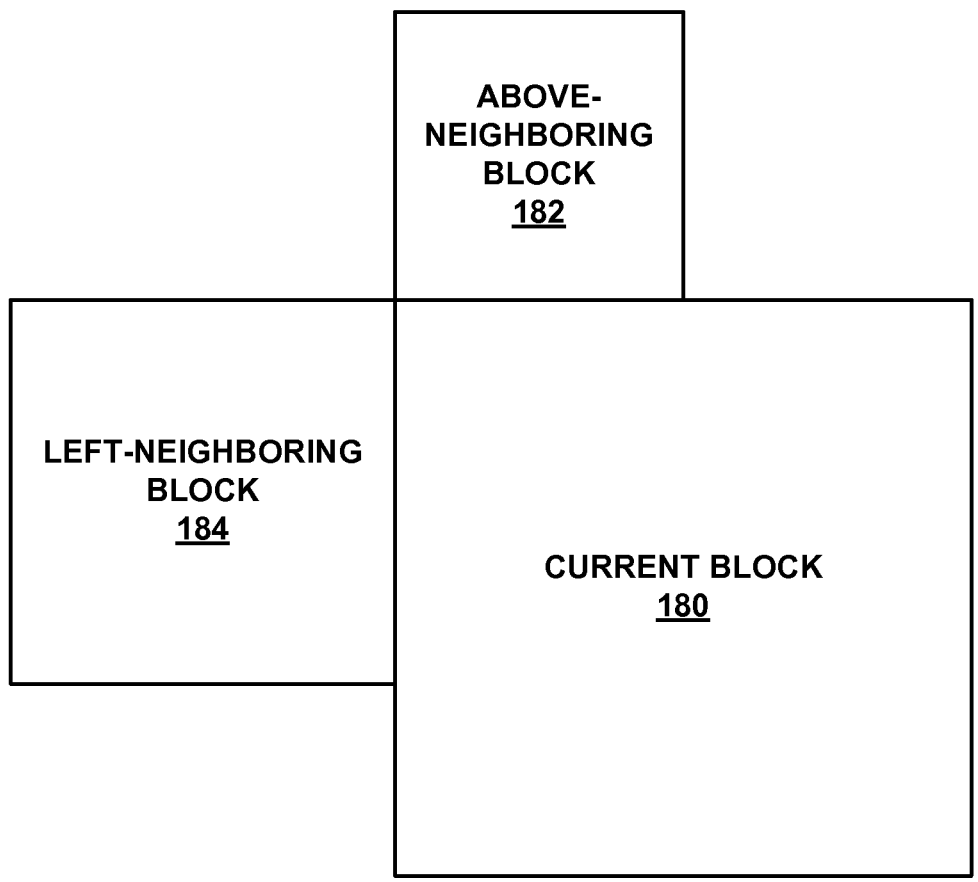
FIG. 5 is a block diagram illustrating example neighboring blocks from which context can be determined for entropy coding a block.

FIG. 5 is a block diagram illustrating example neighboring blocks from which context can be determined for entropy coding a block. While FIG. 5 is described with respect to video decoder 30, it should be understood that the techniques of this disclosure may be carried out by a variety of other video coders, including video encoder 20 (FIGS. 1 and 2), other processors, processing units, hardware-based coding units such as encoder/decoders (CODECs), and the like.

Video decoder 30 may receive entropy coded data associated with current block 180. For example, video decoder 30 may receive an entropy coded significance map, transform coefficients, and a number of other syntax elements to allow video decoder 30 to properly decode current block 180. Video decoder 30 may determine context for one or more of the received syntax elements based on values of syntax elements associated with above-neighboring block 182 and left-neighboring block 184.

Assume, for purposes of explanation, that video decoder 30 is currently decoding a syntax element indicating a particular prediction mode (e.g., an intra-prediction mode) of pixels within current block 180. In this example, video decoder 30 may identify the intra-prediction modes from above-neighboring block 182 and left-neighboring block 184 to determine context for the current syntax element. Accordingly, a context model used to entropy decode the current syntax element may depend to the intra-prediction modes of above-neighboring block 182 and left-neighboring block 184. Thus, video decoder 30 may store, or buffer data indicating the intra-prediction modes of above-neighboring block 182 and left-neighboring block 184, so that such data is available when performing entropy decoding.

While entropy coding a syntax element associated an intra-prediction mode is described for purposes of example, other syntax elements may also be coded based on data of neighboring blocks. For example, with respect to the emerging HEVC standard, the following syntax elements may be entropy coded using context that includes data from neighboring blocks, including above-neighboring block 182 and left-neighboring block 184:

1. skip_flag[x0][y0].
   a) skip_flag equal to 1 specifies that for the current CU, when decoding a P or B slice, no additional syntax elements are parsed after skip_flag[x0][y0],other than the motion vector predictor indices. skip_flag[x0][y0] equal to 0 specifies that the coding unit is not skipped. The array indices x0, y0 specify the location (x0, y0) of the top-left luma sample of the coding block relative to the top-left luma sample of the picture.
2. split_coding_unit_flag
   a) split_coding_unit_flag[x0][y0] specifies whether a coding unit is split into coding units with half horizontal and vertical size. The array indices x0, y0 specify the location (x0, y0) of the top-left luma sample of the coding block relative to the top-left luma sample of the picture.
3. cbp of luma block
   a) The coded block pattern (CBP) specifies which luma blocks contain non-zero transform coefficient levels. That is, the CBP of a luma block may correspond to one or more coded block flags, each of the coded block flags having a value indicative of whether a respective luma block is coded (includes one or more non-zero transform coefficient level values) or uncoded (includes all zero-valued transform coefficients).
4. cbp of chroma block
   a) The coded block pattern (CBP) specifies which chroma blocks contain non-zero transform coefficient levels. That is, the CBP of a chroma block may correspond to one or more coded block flags, each of the coded block flags having a value indicative of whether a respective chroma block is coded (includes one or more non-zero transform coefficient level values) or uncoded (includes all zero-valued transform coefficients).
5. bin0 of chroma intra mode
   a) intra_chroma_pred_mode[x0][y0] specifies the intra prediction mode for chroma samples. The array indices x0, y0 specify the location (x0, y0) of the top-left luma sample of the prediction block (PU) relative to the top-left luma sample of the picture.
6. no_residual_data_flag
   a) no_residual_data_flag equal to 1 specifies that no residual data is present for the current coding unit. no_residual_data_flag equal to 0 specifies that residual data is present for the current coding unit.
7. merge_flag
   a) merge_flag[x0][y0] specifies whether the inter prediction parameters for the current PU are inferred from a neighboring inter-predicted partition. The array indices x0, y0 specify the location (x0, y0) of the top-left luma sample of the considered prediction block relative to the top-left luma sample of the picture.
8. bin0 of ref_idx
   a) ref_idx_l0[x0][y0] specifies the list 0 reference picture index for the current PU. The array indices x0, y0 specify the location (x0, y0) of the top-left luma sample of the prediction block relative to the top-left luma sample of the picture.
   b) ref_idx_l1 [x0][y0] has the same semantics as ref_idx_l0, with l0 and list 0 replaced by l1 and list 1, respectively.
   c) ref_idx_lc[x0][y0] has the same semantics as ref_idx_l0, with l0 and list 0 replaced by lc and list combination, respectively.
9. bin0 of mvd
   a) mvd_l0[x0][y0][compIdx], specifies the difference between a list 0 vector component to be used and the predictive vector. The array indices x0, y0 specify the location (x0, y0) of the top-left luma sample of the prediction block relative to the top-left luma sample of the picture. The horizontal motion vector component difference is assigned compIdx=0 and the vertical motion vector component is assigned compIdx=1.
   b) mvd_l1[x0][y0][compIdx] has the same semantics as mvd_l0, with l0 and list 0 replaced by l1 and list 1, respectively.
   c) mvd_lc[x0][y0][compIdx] has the same semantics as mvd_l0, with l0 and list 0 replaced by lc and list combination, respectively.
10. inter_pred_flag
    a) inter_pred_flag[x0][y0] specifies whether uni-prediction or bi-prediction is used for the current prediction unit. The array indices x0, y0 specify the location (x0, y0) of the top-left luma sample of the prediction block relative to the top-left luma sample of the picture.
11. cbp of intra chroma block
    a) The coded block pattern (CBP) specifies which blocks may contain non-zero transform coefficient levels.

The syntax elements listed above are provided for purposes of example only. That is, video decoder 30 may use data from neighboring blocks, such as above-neighboring block 182 and left-neighboring block 184, when entropy coding other syntax elements associated with current block 180.

Figure 6:
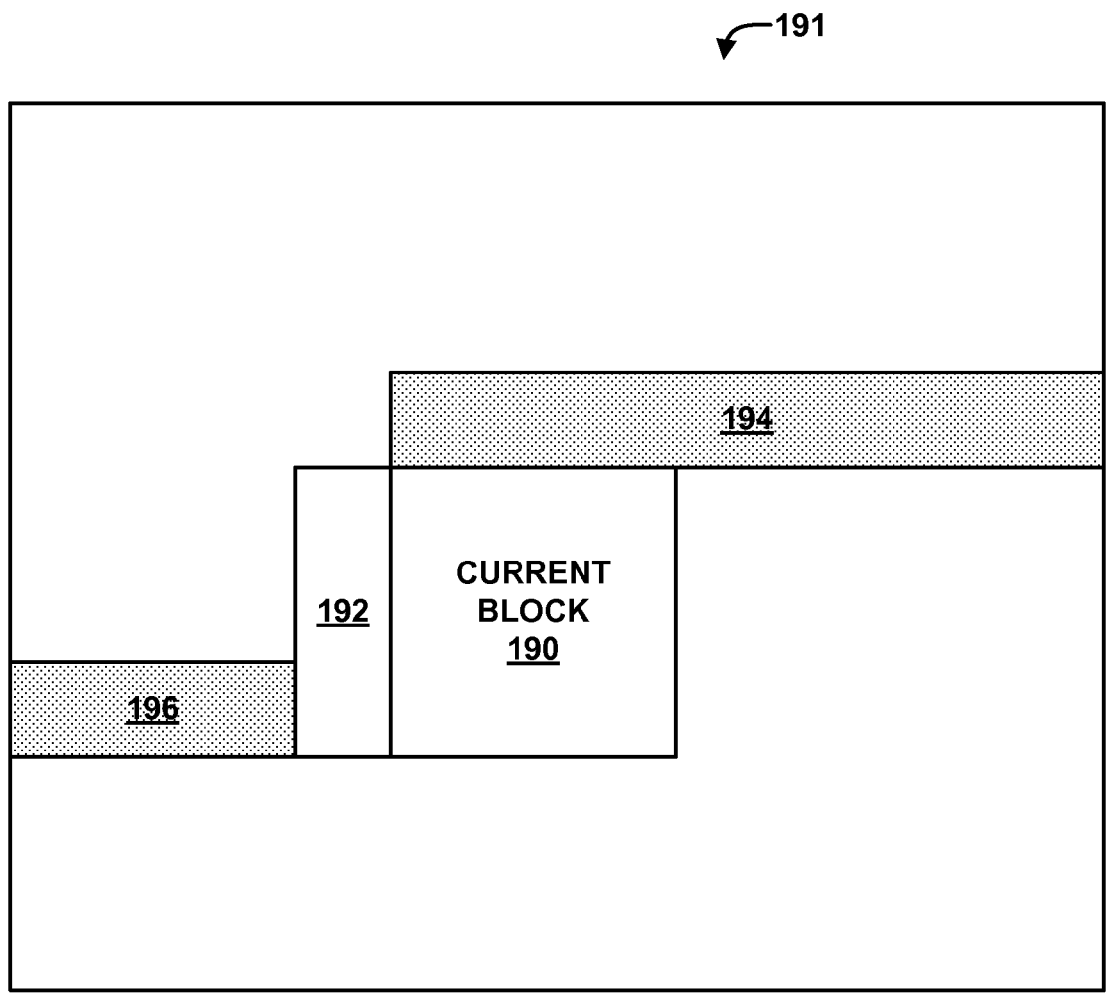
FIG. 6 is a block diagram illustrating example neighboring blocks from which context may be determined for entropy coding a block.

FIG. 6 is a block diagram illustrating example neighboring blocks from which context may be determined for entropy coding a block, according to aspects of this disclosure. While FIG. 6 is described with respect to video decoder 30, it should be understood that the techniques of this disclosure may be carried out by a variety of other video coders, including video encoder 20 (FIGS. 1 and 2), other processors, processing units, hardware-based coding units such as encoder/decoders (CODECs), and the like.

Video decoder 30 may receive entropy coded data associated with current block 190 of coded unit 191. For example, video decoder 30 may receive an entropy coded significance map, transform coefficients (whether intra- or inter-predicted), and a number of other syntax elements to allow video decoder 30 to properly decode current block 190 of coded unit 191. Coded unit 191 may generally include a predefined quantity of video data including multiple blocks of the video data, such as, for example, a slice, a tile or set of tiles, a set of wavefronts, or any other predefined unit that includes multiple blocks of video data. While above-neighboring blocks 194, left neighboring blocks 192, and blocks 196 are generally shown as undivided blocks in the example of FIG. 6, it should be understood that such blocks may be divided into one or more smaller blocks.

According to aspects of this disclosure, rather than using data from above-neighboring blocks 194 (as shown, for example, in FIG. 5) as context information for determining a probability model when coding a syntax element, video decoder 30 may use only data from left-neighboring blocks 192 as context information for entropy coding current block 190. For example, video decoder 30 may not use data from above-neighboring blocks 194 or previously coded blocks 196 that are not positioned adjacent to current block 190 as context information for determining a probability model for entropy coding current block 190. In this example, video decoder 30 may buffer less data than the example shown in FIG. 5. For example, assuming a maximum LCU size of 64×64 pixels and a smallest CU size of 4×4 pixels, video decoder 30 may potentially buffer data associated with just 16 blocks of video data (e.g., 64/4=16 potential left-neighboring blocks).

According to other aspects of this disclosure, video decoder 30 may only use data from neighboring blocks when determining context for entropy coding current block 190 when the neighboring blocks are part of the same LCU as current block 190. For example, video decoder 30 may only use data from neighboring blocks for determining context for current block 190 when current block 190 and the neighboring blocks are sub-CUs of the same LCU. That is, in some examples, video decoder 30 does not utilize data across an LCU boundary when determining context for entropy coding current block 190. The LCU boundary restriction may be placed on the above-neighboring blocks 194, the left-neighboring blocks 192, or both the above-neighboring blocks 194 and the left-neighboring blocks 192.

According to other aspects of this disclosure, video decoder 30 may determine context for entropy coding current block 190 based on local CU and/or LCU information associated with current block 190. For example, video decoder 30 may determine context for inter-predicted data (e.g., inter_pred_flag) based on CU depth, which generally corresponds to a number of times that an LCU to which current block 190 belongs has been partitioned. As another example, video decoder 30 may determine context for intra-predicted data (e.g., cbp of intra chroma block) based on TU depth, which generally corresponds to a number of times a TU of current block 190 has been partitioned.

In some examples, video decoder 30 may use data from a combination of sources as context information when determining a probability model for entropy coding current block 190. For example, video decoder 30 may implement any combination of the techniques of this disclosure when determining context for entropy coding current block 190. That is, in an example, video decoder 30 may use data from both left-neighboring blocks 192 (e.g., excluding above-neighboring blocks or other blocks), as well as data from local CU and/or LCU information associated with current block 190 as context information when determining a probability model. In another example, video decoder 30 may use data from neighboring blocks that are part of the same LCU as current block 190 (e.g., excluding other neighboring blocks), as well as from local CU and/or LCU information associated with current block 190 as context information when determining a probability model.

Additionally or alternatively, video decoder 30 may use a single context for entropy coding current block 190. For example, video decoder 30 may determine context for a particular syntax element associated with current block 190 based on the syntax element itself. In some examples, video decoder 30 may use a single context for syntax elements including no_residual_data_flag, merge_flag, bin0 of ref_idx, and bin0 of mvd, as described above with respect to FIG. 5.

By limiting the locations from which context information is derived, as shown and described in the example of FIG. 6, video decoder 30 may reduce the amount of data that is buffered for purposes of context derivation. In addition, video decoder 30 may increase parsing throughput and/or robustness. For example, as noted above, video decoder 30 may parse received video data according to a particular parsing process (e.g., wavefront parsing). In examples in which video decoder 30 does not determine context using data from certain neighboring blocks, video decoder 30 may eliminate context dependencies to improve parsing throughput and the ability to process video data in parallel. In addition, eliminating context dependencies may reduce the potential for context derivation errors, thereby improving parsing robustness.

Figure 7:
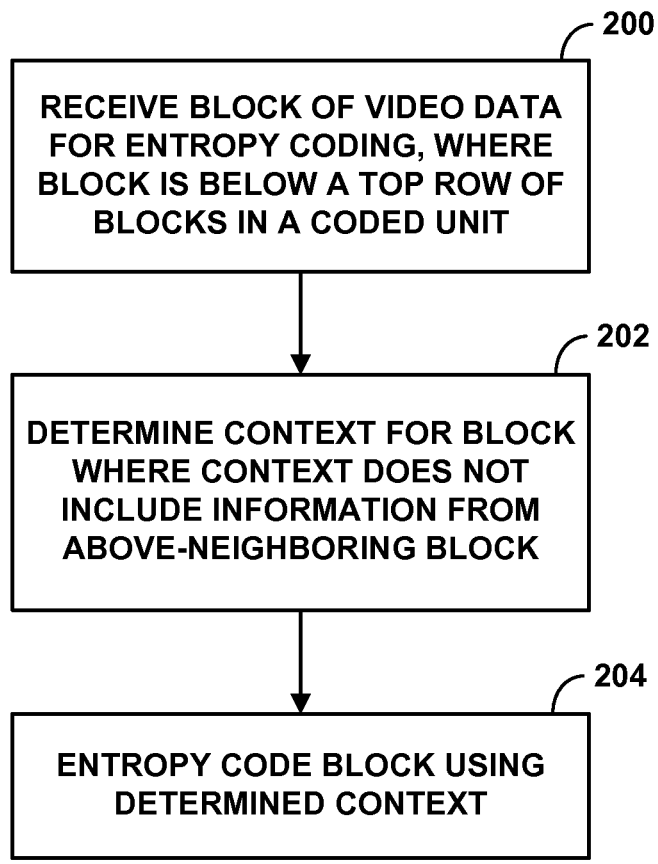
FIG. 7 is a flowchart illustrating an example method of entropy coding a block of video data.

FIG. 7 is a flow diagram illustrating an example technique of entropy coding a block of video data. The example shown in FIG. 7 is generally described as being performed by a video coder. It should be understood that, in some examples, the technique of FIG. 7 may be carried out by video encoder 20 (FIGS. 1 and 2) or video decoder 30 (FIGS. 1 and 3), described above. In other examples, the technique of FIG. 7 may be performed by a variety of other processors, processing units, hardware-based coding units such as encoder/decoders (CODECs), and the like.

The video coder may receive a block of video data of a coded unit (e.g., a picture, slice, tile, set of wavefronts, and the like) for entropy coding (200). According to aspects of this disclosure, the block of video data may be positioned below a top row of a coded unit (CU). For example, the video coder may determine whether the block currently being entropy coded is positioned below another row of blocks of the coded unit. In some examples, the block currently being entropy coded may be a sub-CU that is included in the same LCU as above-neighboring sub-CUs. In other examples, the block may be positioned at the edge of an LCU, such that above-neighboring blocks belong to a different LCU than the current block.

The video coder may then determine context for the block that does not include information from an above neighboring block (202). For example, according to aspects of this disclosure, rather than using information from above-neighboring blocks, the video coder may use information from left-neighboring blocks when determining context for selecting a probability model. In some examples, the left-neighboring blocks may be included within the same LCU as the block currently being coded. In other examples, the left-neighboring blocks may be included in a different LCU than the block currently being coded.

In another example, the block of video data may include one or more blocks of an LCU, and the above-neighboring blocks may include one or more other LCUs. In such an example, according to aspects of this disclosure, the video coder may determine context for the block using information associated with the other blocks the LCU, but exclude the above-neighboring blocks (included in other LCUs). In an example for purposes of illustration, the block being coded may include a first sub-CU of an LCU, and the above-neighboring blocks may include one or more other LCUs. Assume also that a second sub-CU is positioned above the first sub-CU (in the same LCU). In this example, the video coder may determine context information for the first sub-CU using information from the second sub-CU, which is positioned above the first sub-CU.

In another example, according to aspects of this disclosure, the video coder may determine context for entropy coding the block based on local CU and/or LCU information associated with the block. For example, the video coder may determine context based on CU depth or TU depth (e.g., according to a quadtree structure, as shown in FIG. 4), the size of the LCU, or other characteristics. That is, the video coder may determine context for inter-predicted data based on CU depth, which generally corresponds to a number of times an LCU has been partitioned to reach the current block. As another example, the video coder may determine context for intra-predicted data based on transform depth, which describes the number of times a TU for the current block as been divided. Other examples are also possible, such as determining context for the current block based on the size of the CU to which the block belongs, the size of the TU associated with the block, and the like.

In other examples, the video coder may determine context for the block in other manners. For example, according to some aspects, the video coder may use a single context when entropy coding the block. That is, the video coder may determine context for coding the current block based on a syntax element currently being coded (e.g., a syntax element maps directly to a certain context).

In some examples, the video coder may use information from a combination of sources when determining context for entropy coding the block. For example, the video coder may use information from both left-neighboring blocks and information from local CU and/or LCU characteristics. In another example, the video coder may use information from neighboring blocks that are part of the same LCU as the block and information from local CU and/or LCU characteristics. After determining the context, the video coder may entropy code the block using the determined context, as noted above (204).

While the process shown in FIG. 7 is described generically with respect to coding a block of video data, it should be understood that a block of video data may include more than one associated syntax elements (as described, for example, with respect to FIGS. 5 and 6 above). Accordingly, the process shown and described in the example of FIG. 7 may be carried out multiple times when entropy coding a block of video data. That is, for example, the video coder may entropy code some syntax elements associated with the block of video data differently than others. Thus, one syntax element may be entropy coded using context based on a characteristic of the block, while another syntax element may be entropy coded in another manner.

It should also be understood that the steps shown and described with respect to FIG. 7 are provided as merely one example. That is, the steps of the method of FIG. 7 need not necessarily be performed in the order shown in FIG. 7, and fewer, additional, or alternative steps may be performed.

Figure 8:
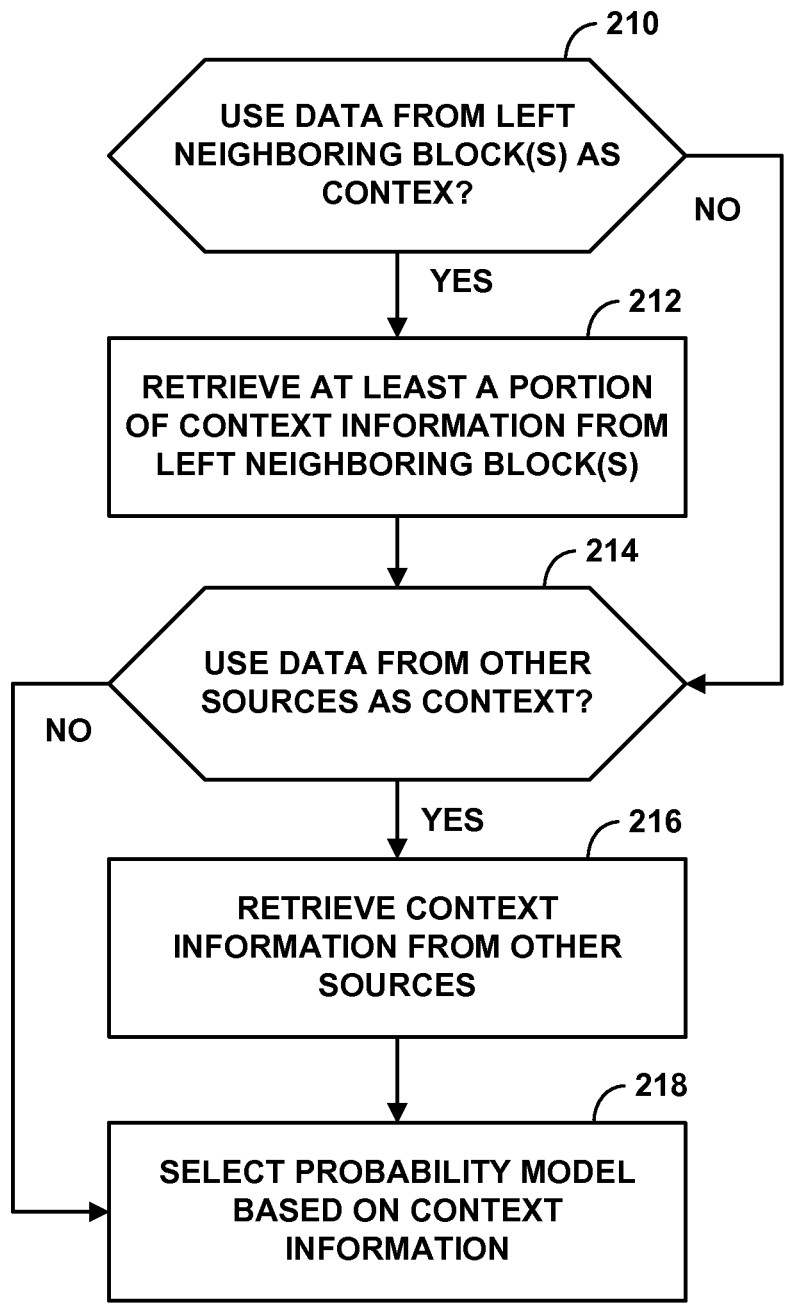
FIG. 8 is a flowchart illustrating another example method of entropy coding a block of video data.

FIG. 8 is a flow diagram illustrating an example technique of entropy coding a block of video data. The example shown in FIG. 8 is generally described as being performed by a video coder. It should be understood that, in some examples, the technique of FIG. 8 may be carried out by video encoder 20 (FIGS. 1 and 2) or video decoder 30 (FIGS. 1 and 3), described above. In other examples, the technique of FIG. 8 may be performed by a variety of other processors, processing units, hardware-based coding units such as encoder/decoders (CODECs), and the like.

According to some examples, the techniques of the example shown in FIG. 8 may be performed with the techniques shown in FIG. 7. For example, the techniques of the example shown in FIG. 8 may be performed during step 202 of FIG. 7.

In the example of FIG. 8, a video coder determines whether to use data from left neighboring blocks as context information for selecting a probability model to entropy code a particular syntax element (210). For example, as noted above with respect to FIG. 7, the video coder may not use information from an above neighboring block when determining context for entropy coding one or more syntax elements. According to aspects of this disclosure, rather than using information from above-neighboring blocks, the video coder may use information from left-neighboring blocks when determining context for selecting a probability model. In such examples (e.g., the YES branch of step 210), the video coder may retrieve at least a portion of context information from left neighboring blocks (212). In some examples, the left-neighboring blocks may be included within the same LCU as the block currently being coded. In other examples, the left-neighboring blocks may be included in a different LCU than the block currently being coded.

The video coder may then determine whether to use data from other sources as context for entropy coding (214). If the video coder does not use data from the left-neighboring blocks as context (e.g., the NO branch of step 210), the video coder may proceed directly to step 214. In any event, the video coder may determine context based on local CU and/or LCU information associated with the block. That is, the video coder may determine context based on CU depth or TU depth (e.g., according to a quadtree structure, as shown in FIG. 4), the size of the LCU, or other characteristics. In other examples, the video coder may determine a single context. That is, the video coder may determine context based on a syntax element currently being coded (e.g., a syntax element maps directly to a certain context).

If the video coder does use data from other sources as context (e.g., the YES branch of step 214), the video coder may retrieve the appropriate context information from the other source or sources (216). The video coder may then select a probability model based on the determined context information (218). If the video coder does not use data from other sources as context, the video coder may proceed directly to step 218.

It should also be understood that the steps shown and described with respect to FIG. 8 are provided as merely one example. That is, the steps of the method of FIG. 8 need not necessarily be performed in the order shown in FIG. 8, and fewer, additional, or alternative steps may be performed.

Figure 9:
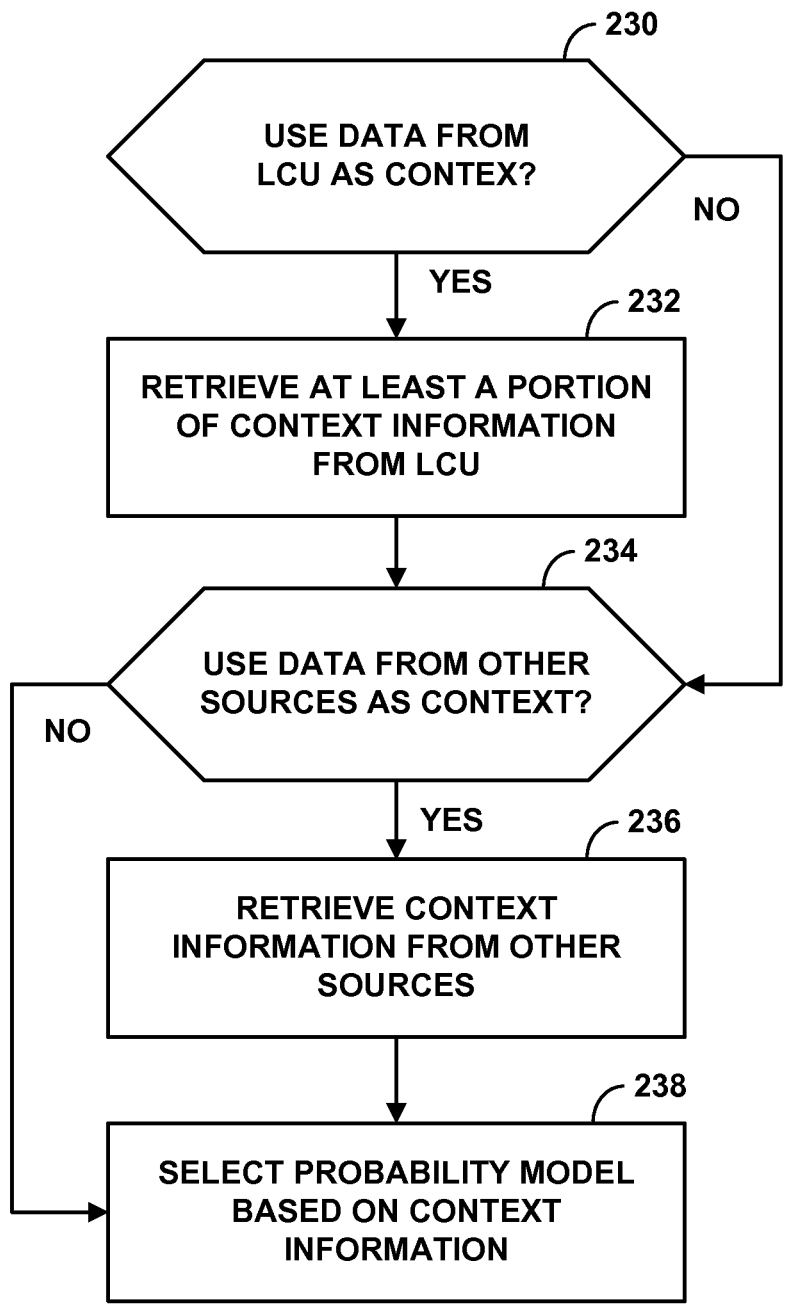
FIG. 9 is a flowchart illustrating another example method of entropy coding a block of video data.

FIG. 9 is a flow diagram illustrating an example technique of entropy coding a block of video data. The example shown in FIG. 9 is generally described as being performed by a video coder. It should be understood that, in some examples, the technique of FIG. 9 may be carried out by video encoder 20 (FIGS. 1 and 2) or video decoder 30 (FIGS. 1 and 3), described above. In other examples, the technique of FIG. 9 may be performed by a variety of other processors, processing units, hardware-based coding units such as encoder/decoders (CODECs), and the like.

According to some examples, the techniques of the example shown in FIG. 9 may be performed with the techniques shown in FIG. 7. For example, the techniques of the example shown in FIG. 9 may be performed during step 202 of FIG. 7.

In the example of FIG. 9, a video coder determines whether to use data from the current LCU as context information for selecting a probability model to entropy code a particular syntax element from the current LCU (230). For example, as noted above with respect to FIG. 7, in some instances the video coder may not use information from an above-neighboring block when determining context for entropy coding one or more syntax elements. However, according to aspects of this disclosure, the video coder may use data associated with an above-neighboring block when determining context, but only when the above-neighboring block is from the same LCU as the block currently being coded. That is, the video coder may refrain from crossing an LCU boundary when determining context for coding syntax elements associated with the LCU.

In such examples (e.g., the YES branch of step 230), the video coder may retrieve at least a portion of context information from blocks for the LCU (232). The video coder may then determine whether to use data from other sources as context for entropy coding (234). If the video coder does not use data from the current LCU as context (e.g., the NO branch of step 230), the video coder may proceed directly to step 234. In any event, the video coder may determine context based on local CU and/or LCU information associated with the block. That is, the video coder may determine context based on CU depth or TU depth (e.g., according to a quadtree structure, as shown in FIG. 4), the size of the LCU, or other characteristics. In other examples, the video coder may determine a single context. That is, the video coder may determine context based on a syntax element currently being coded (e.g., a syntax element maps directly to a certain context).

If the video coder does use data from other sources as context (e.g., the YES branch of step 234), the video coder may retrieve the appropriate context information from the other source or sources (236). The video coder may then select a probability model based on the determined context information (238). If the video coder does not use data from other sources as context, the video coder may proceed directly to step 238.

It should also be understood that the steps shown and described with respect to FIG. 9 are provided as merely one example. That is, the steps of the method of FIG. 9 need not necessarily be performed in the order shown in FIG. 9, and fewer, additional, or alternative steps may be performed.

Figure 10:
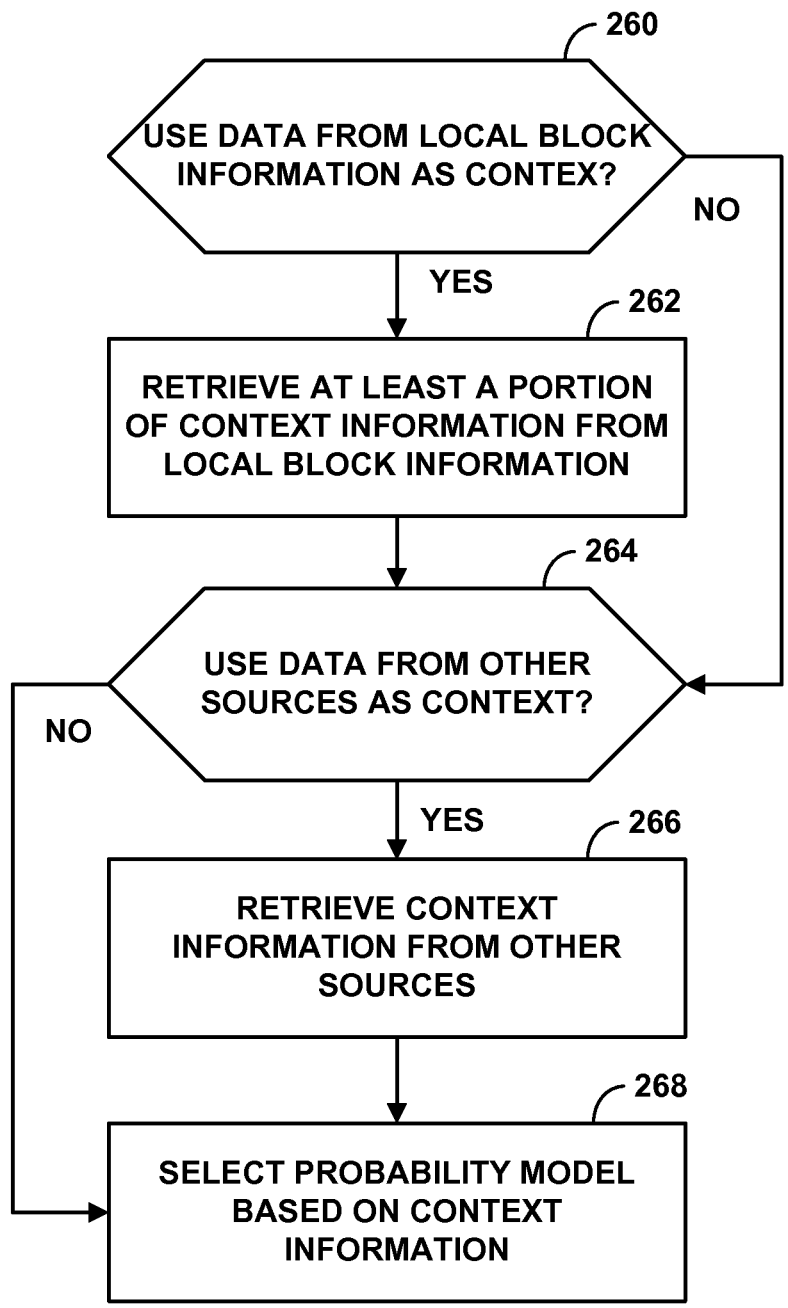
FIG. 10 is a flowchart illustrating another example method of entropy coding a block of video data.

FIG. 10 is a flow diagram illustrating an example technique of entropy coding a block of video data. The example shown in FIG. 10 is generally described as being performed by a video coder. It should be understood that, in some examples, the technique of FIG. 10 may be carried out by video encoder 20 (FIGS. 1 and 2) or video decoder 30 (FIGS. 1 and 3), described above. In other examples, the technique of FIG. 8 may be performed by a variety of other processors, processing units, hardware-based coding units such as encoder/decoders (CODECs), and the like.

According to some examples, the techniques of the example shown in FIG. 10 may be performed with the techniques shown in FIG. 7. For example, the techniques of the example shown in FIG. 10 may be performed during step 202 of FIG. 7.

In the example of FIG. 10, a video coder determines whether to use data from local block information as context information for selecting a probability model to entropy code a particular syntax element (260). For example, as noted above with respect to FIG. 7, the video coder may not use information from an above neighboring block when determining context for entropy coding one or more syntax elements. According to aspects of this disclosure, rather than using information from above-neighboring blocks, the video coder may use data from local block information. In such examples (e.g., the YES branch of step 210), the video coder may retrieve at least a portion of context information from local block information (212).

For example, the video coder may use data from one or more characteristics of a CU when determining context information. That is, in an example, the video coder may entropy code inter-predicted residual data of a CU. In this example, the video coder may determine a CU depth when determining context information for entropy coding the inter-predicted residual data. In other words, when coding syntax elements for a CU at a particular CU depth, the video coder may use the CU depth as context information for selecting a probability model. In an example for purposes of illustration, the video coder may entropy code an inter-prediction flag (inter_pred_flag) associated with inter-predicted data at a particular CU depth using the particular CU depth as context information.

In another example, the video coder may use data from one or more characteristics of a TU when determining context information. That is, in an example, the video coder may entropy code intra-predicted residual data of a TU. In this example, the video coder may determine a TU depth when determining context information for entropy coding the intra-predicted residual data. In other words, when coding syntax elements for a TU at a particular TU depth, the video coder may use the TU depth as context information for selecting a probability model. In an example for purposes of illustration, the video coder may entropy code one or more syntax elements of a coded block pattern at a particular TU depth using the particular TU depth as context information.

The video coder may then determine whether to use data from other sources as context for entropy coding (264). For example, the video coder may determine context for entropy coding using data from left-neighboring blocks (e.g., FIG. 8) or data from other blocks in an LCU being coded (e.g., FIG. 9). In other examples, the video coder may determine context based on a syntax element currently being coded (e.g., a syntax element maps directly to a certain context).

If the video coder does use data from other sources as context (e.g., the YES branch of step 264), the video coder may retrieve the appropriate context information from the other source or sources (266). The video coder may then select a probability model based on the determined context information (268). If the video coder does not use data from other sources as context, the video coder may proceed directly to step 268.

It should also be understood that the steps shown and described with respect to FIG. 10 are provided as merely one example. That is, the steps of the method of FIG. 10 need not necessarily be performed in the order shown in FIG. 10, and fewer, additional, or alternative steps may be performed.

Moreover, it should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of coding video data, the method comprising:
   determining context information for one or more syntax elements associated with a block of video data, wherein the block is included within a coding unit (CU) of video data, wherein the video data defines a quadtree structure and the coding unit is a node of the quadtree structure, and wherein determining the context information comprises determining the context information based on a depth in the quadtree structure; and
   entropy coding the one or more syntax elements using the determined context information, wherein entropy coding the one or more syntax elements comprises context-adaptive binary arithmetic coding the one or more syntax elements, and wherein context-adaptive binary arithmetic coding the one or more syntax elements comprises selecting a probability model from a plurality of probability models for coding the one or more syntax elements using the determined context information.

2. The method of claim 1, wherein determining the context information for the one or more syntax elements comprises determining first context information for a first set of syntax elements, the method further comprising:
   determining second context information for a second set of syntax elements based on at least a portion of the context information from a block that neighbors the block.

3. The method of claim 2, wherein the block comprises one or more blocks of a largest coding unit LCU that is positioned below a row of blocks belonging to one or more other LCUs, and wherein determining context information for the second set of syntax elements comprises determining context information using information associated with one or more blocks of the LCU and excluding information outside of the LCU.

4. The method of claim 1, wherein determining the context information for the one or more syntax elements comprises determining context information for inter-prediction data of the CU based on the depth of the CU.

5. The method of claim 4, wherein determining the context information for the inter-prediction data of the CU comprises determining context information for one or more syntax elements that indicate whether the CU is split based on the depth of the CU.

6. The method of claim 4, wherein determining the context information for the inter-prediction data of the CU comprises determining context information for an inter-prediction flag (inter_pred_flag) based on the depth of the CU.

7. The method of claim 1, wherein the CU comprises a transform unit (TU), and wherein determining the context information for the one or more syntax elements comprises determining context information for one or more syntax elements associated with the TU based on the depth of the TU.

8. The method of claim 7, wherein determining the context information for the one or more syntax elements associated with the TU comprises determining context information for intra-predicted residual data of the TU based on the depth of the TU.

9. The method of claim 8, wherein determining the context information for the intra-predicted residual data of the TU comprises determining context information for one or more syntax elements that indicate whether the TU contains non-zero transform coefficient levels based on the depth of the TU.

10. The method of claim 1, further comprising generating the one or more syntax elements, and wherein entropy coding the one or more syntax elements comprises entropy encoding the one or more syntax elements.

11. The method of claim 10, further comprising encoding the block of video data comprising:
    applying a transform to one or more residual values of the block to generate transform coefficients;
    quantizing the transform coefficients to generate quantized transform coefficients; and
    entropy encoding the quantized transform coefficients.

12. The method of claim 1, further comprising receiving the one or more syntax elements from an encoded bitstream, and wherein entropy coding the one or more syntax elements comprises entropy decoding the one or more syntax elements block of video data.

13. The method of claim 12, further comprising decoding the block of video data comprising:
    entropy decoding a received bitstream to generate quantized transform coefficients associate with the block of video data;
    inverse quantizing the quantized transform coefficients to generate transform coefficients; and
    applying an inverse transform to the transform coefficients to generate residual values associated with the block of video data.

14. An apparatus for coding video data, the apparatus comprising:
    a memory configured to store a block of video data; and
    one or more processors configured to:
        determine context information for one or more syntax elements associated with a block of video data, wherein the block is included within a coding unit (CU) of video data, wherein the video data defines a quadtree structure and the CU is a node of the quadtree structure, and wherein determining the context information comprises determining the context information based on a depth in the quadtree structure; and
        entropy code the one or more syntax elements using the determined context information, wherein to entropy code the one or more syntax elements, the one or more processors are configured to context-adaptive binary arithmetic code the one or more syntax elements, and wherein to context-adaptive binary arithmetic code the one or more syntax elements, the one or more processors are configured to select a probability model from a plurality of probability models for coding the one or more syntax elements using the determined context information.

15. The apparatus of claim 14, wherein, to determine the context information for the one or more syntax elements comprises determining first context information for a first set of syntax elements, the method further comprising, the one or more processors are configured to:
    determine second context information for a second set of syntax elements based on at least a portion of the context information from a block that neighbors the block.

16. The apparatus of claim 15, wherein the block comprises one or more blocks of a largest coding unit LCU that is positioned below a row of blocks belonging to one or more other LCUs, and wherein, to determine context information for the second set of syntax elements, the one or more processors are configured to determine context information using information associated with one or more blocks of the LCU and exclude information outside of the LCU.

17. The apparatus of claim 14, wherein to determine the context information for the one or more syntax elements, the one or more processors are configured to determine context information for inter-prediction data of the CU based on the depth of the CU.

18. The apparatus of claim 17, wherein to determine the context information for the inter-prediction data of the CU, the one or more processors are configured to determine context information for one or more syntax elements that indicate whether the CU is split based on the depth of the CU.

19. The apparatus of claim 18, wherein to determine the context information for the inter-prediction data of the CU, the one or more processors are configured to determine context information for an inter-prediction flag (inter_pred_flag) based on the CU depth of the CU.

20. The apparatus of claim 14, wherein the CU comprises a transform unit (TU), and wherein to determine the context information for the one or more syntax elements, the one or more processors are configured to determine context information for one or more syntax elements associated with the TU based on the depth of the TU.

21. The apparatus of claim 20, wherein to determine the context information for the one or more syntax elements associated with the TU, the one or more processors are configured to determine context information for intra-predicted residual data of the TU based on the depth of the TU.

22. The apparatus of claim 21, wherein to determine the context information for the intra-predicted residual data of the TU, the one or more processors are configured to determine context information for one or more syntax elements that indicate whether the TU contains non-zero transform coefficient levels based on the depth of the TU.

23. The apparatus of claim 14, wherein the one or more processors are further configured to generate the one or more syntax elements and wherein to entropy code the one or more syntax elements, the one or more processors are configured to entropy encode the one or more syntax elements.

24. The apparatus of claim 23, wherein the one or more processors are further configured to encode the block of video data, and to encode the block of video data, the one or more processors are configured to:
    apply a transform to one or more residual values of the block to generate transform coefficients;
    quantize the transform coefficients to generate quantized transform coefficients; and
    entropy encode the quantized transform coefficients.

25. The apparatus of claim 14, wherein the one or more processors are configured to receive the one or more syntax elements from an encoded bitstream, and wherein to entropy code the one or more syntax elements, the one or more processors are configured to entropy decode the one or more syntax elements.

26. The apparatus of claim 25, wherein the one or more processors are further configured to decode the block of video data, and to decode the block of video data, the one or more processors are configured to:
   entropy decode a received bitstream to generate quantized transform coefficients associate with the block of video data;
   inverse quantize the quantized transform coefficients to generate transform coefficients; and
   apply an inverse transform to the transform coefficients to generate residual values associated with the block of video data.

27. An apparatus for coding video data, the apparatus comprising:
   means for determining context information for one or more syntax elements associated with a block of video data, wherein the block is included within a coding unit (CU) of video data, wherein the video data defines a quadtree structure and the CU is a node of the quadtree structure, and wherein determining the context information comprises determining the context information based on a depth in the quadtree structure; and
   means for entropy coding the one or more syntax elements using the determined context information, wherein the means for entropy coding the one or more syntax elements comprises means for context-adaptive binary arithmetic coding the one or more syntax elements, and wherein the means for context-adaptive binary arithmetic coding the one or more syntax elements comprises means for selecting a probability model from a plurality of probability models for coding the one or more syntax elements using the determined context information.

28. The apparatus of claim 27, wherein the means for determining the context information for the one or more syntax elements comprises determining first context information for a first set of syntax elements, the method further comprising:
   means for determining second context information for a second set of syntax elements based on at least a portion of the context information from a block that neighbors the block.

29. The apparatus of claim 28, wherein the block comprises one or more blocks of a lamest coding unit (LCU) that is positioned below a row of blocks belonging to one or more other LCUs, and wherein the means for determining the context information for the second set of syntax elements comprises means for determining the context information using information associated with one or more blocks of the LCU and excluding information outside of the LCU.

30. The apparatus of claim 27, wherein the means for determining the context information for the one or more syntax elements comprises means for determining context information for inter-prediction data of the CU based on the depth of the CU.

31. The apparatus of claim 30, wherein the means for determining the context information for the inter-prediction data of the CU comprises means for determining context information for one or more syntax elements that indicate whether the CU is split based on the depth of the CU.

32. The apparatus of claim 31, wherein the means for determining the context information for the inter-prediction data of the CU comprises means for determining context information for an inter-prediction flag (inter_pred_flag) based on the CU depth of the CU.

33. The apparatus of claim 27, wherein the CU comprises a transform unit (TU), and wherein the means for determining the context information for the one or more syntax elements comprises means for determining context information for one or more syntax elements associated with the TU based on the depth of the TU.

34. The apparatus of claim 33, wherein the means for determining the context information for the one or more syntax elements associated with the TU comprises means for determining context information for intra-predicted residual data of the TU based on the depth of the TU.

35. The apparatus of claim 34, wherein the means for determining the context information for the intra-predicted residual data of the TU comprises means for determining context information for one or more syntax elements that indicate whether the TU contains non-zero transform coefficient levels based on the depth of the TU.

36. A non-transitory computer-readable storage medium having stored thereon instructions that, when executed, cause one or more processors to:
   determine context information for one or more syntax elements associated with a block of video data, wherein the block is included within a coding unit (CU) of video data, wherein the video data defines a quadtree structure and the CU is a node of the quadtree structure, and wherein determining the context information comprises determining the context information based on a depth in the quadtree structure; and
   entropy code the one or more syntax elements using the determined context information, wherein to entropy code the one or more syntax elements, the instructions cause the one or more processors to context-adaptive binary arithmetic code the one or more syntax elements, and wherein to context-adaptive binary arithmetic code the one or more syntax elements, the instructions cause the one or more processors to select a probability model from a plurality of probability models for coding the one or more syntax elements using the determined context information.

37. The non-transitory computer-readable storage medium of claim 36, wherein to determine the context information for the one or more syntax elements the instructions further cause the one or more processors to determine first context information for a first set of syntax elements, and wherein the instructions further cause the one or more processors to:
   determine second context information for a second set of syntax elements based on at least a portion of the context information from a block that neighbors the block.

38. The non-transitory computer-readable storage medium of claim 36, wherein the block comprises one or more blocks of a lamest coding unit (LCU) that is positioned below a row of blocks belonging to one or more other LCUs, and wherein the instructions further cause the one or more processors to determine context information for the second set of syntax elements using information associated with one or more blocks of the LCU and excluding information outside of the LCU.

39. The non-transitory computer-readable storage medium of claim 36, wherein to determine the context information for the one or more syntax elements, the instructions cause the one or more processors to determine context information for inter-prediction data of the CU based on the depth of the CU.

40. The non-transitory computer-readable storage medium of claim 39, wherein to determine the context information for the inter-prediction data of the CU, the instructions cause the one or more processors to determine context information for one or more syntax elements that indicate whether the CU is split based on the depth of the CU.

41. The non-transitory computer-readable storage medium of claim 40, wherein to determine the context information for the inter-prediction data of the CU, the instructions cause the one or more processors to determine context information for an inter-prediction flag (inter_pred_flag) based on the CU depth of the CU.

42. The non-transitory computer-readable storage medium of claim 36, wherein the CU comprises a transform unit (TU), wherein to determine the context information for the one or more syntax elements, the instructions cause the one or more processors to determine context information for one or more syntax elements associated with the TU based on the depth of the TU.

43. The non-transitory computer-readable storage medium of claim 42, wherein to determine the context information for the one or more syntax elements associated with the TU, the instructions cause the one or more processors to determine context information for intra-predicted residual data of the TU based on the depth of the TU.

44. The non-transitory computer-readable storage medium of claim 43, wherein to determine the context information for the intra-predicted residual data of the TU, the instructions cause the one or more processors to determine context information for one or more syntax elements that indicate whether the TU contains non-zero transform coefficient levels based on the depth of the TU.

* * * * *